United States Patent
Becklin

[11] 3,885,701
[45] May 27, 1975

[54] VALANCE MOLDING FOR EQUIPMENT CASES

[75] Inventor: Dennis M. Becklin, Grants Pass, Oreg.

[73] Assignee: Environmental Container Systems, Inc., Palo Alto, Calif.

[22] Filed: Oct. 23, 1973

[21] Appl. No.: 408,509

[52] U.S. Cl. .................................. 220/325; 220/81
[51] Int. Cl. .............................................. B65d 45/16
[58] Field of Search ........... 220/315, 322, 324, 325, 220/327, 81, 66, 67

[56] References Cited
UNITED STATES PATENTS
3,088,623  5/1963  Parker ............................... 220/324

*Primary Examiner*—William I. Price
*Assistant Examiner*—Steven M. Pollard
*Attorney, Agent, or Firm*—Naylor, Neal & Uilkema

[57] ABSTRACT

A valance molding for cases such as impact resistant fiber glass reinforced plastic cases of the type used to house electronic equipment that is used in the field. A valance molding configuration that is formed by extrusion or the like in elongate straight pieces and which can be deformed into conformity with the mouth of the case. A dovetail slot on the inward facing surface of the molding and a clamp body having a corresponding dovetail protrusion for retention in the slot. Portions of the extrusion are excised to afford entry of the clamp body into the slot. The clamp body has a tapped hole therein for receiving a screw that maintains a cover plate in place. A complemental extrusion that forms a watertight seal with the first mentioned extrusion and is secured to the cover of the case. The extrusions are formed so that when the case is closed the equipment panel and circuitry attached thereto are firmly retained by the extrusions against vibration.

7 Claims, 4 Drawing Figures

PATENTED MAY 27 1975  3,885,701
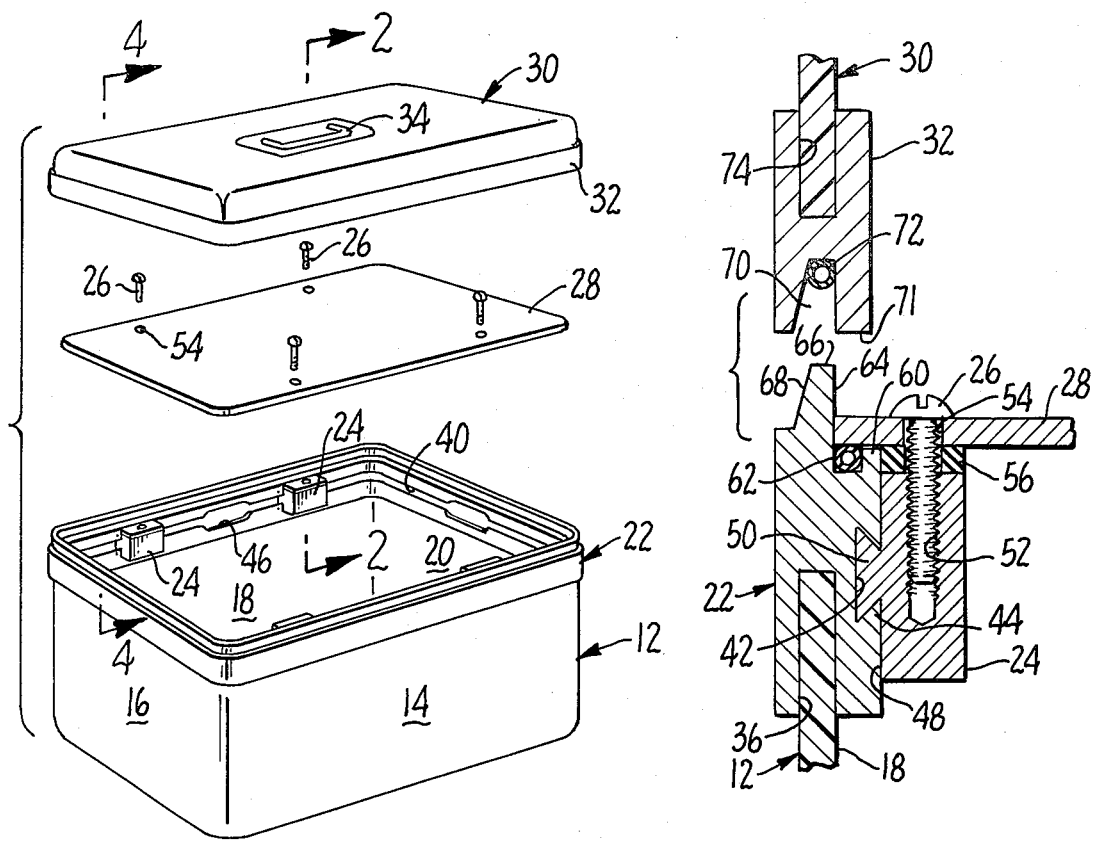
FIG. 1.
FIG. 2.
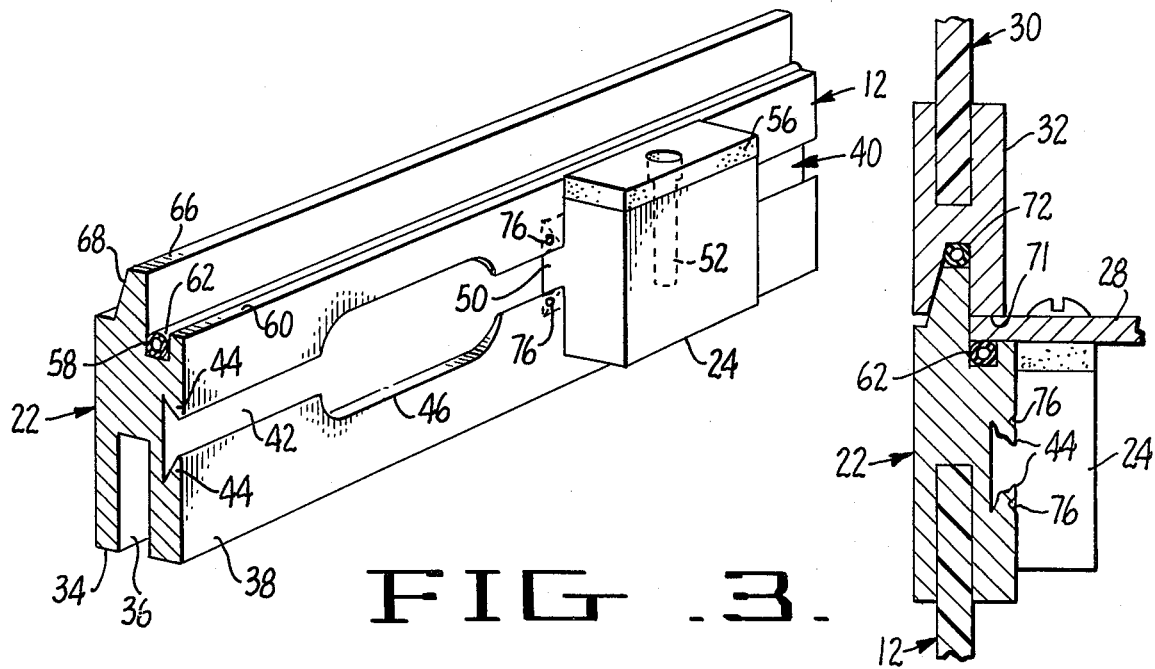
FIG. 3.
FIG. 4.

VALANCE MOLDING FOR EQUIPMENT CASES

This invention relates to a valance molding for a rigid container and more particularly to a valance molding that, in addition to forming a finished edge for the container, affords secure attachment to equipment carried in the container and provides for a substantially weather-tight joint when the container is closed.

Fragile equipment, such as electronic test equipment adapted for use in the field, is typically housed in a container made of fiber glass reinforced plastic, thermoformed plastic, aluminum or like material. In order to maintain the integrity of the container against entry of water and like deleterious substances, it is desirable to secure the equipment within the container by fastening such equipment to the valance molding used at the joint between the main portion and the cover portion of the container. Known prior art devices for achieving this form of construction typically require fabrication of a valance molding for each size container. Such fabrication requires many manufacturing steps and close attention to tolerances which the present invention virtually eliminates.

According to the present invention, there is formed a valance molding for the container edge that has a limited thickness so that it can be deformed or bent to conform to the shape of the edge. The valance molding is typically formed of aluminum and includes a slot for receiving the edge of the case wall to thereby retain the valance molding onto the case. On the inner side surface of the valance molding is formed a dovetail slot; at intervals along the slot portions of the molding adjacent the slot are excised to afford access to the slot. Clamp bodies that have complemental dovetail protrusions are inserted in the excised regions and slid along the slot until they are retained within the slot. The clamp bodies have means, such as threaded holes, for affording attachment of a cover plate thereto. The cover plate typically supports the electronic or like fragile equipment within the container.

An object of the present invention is to provide a valance molding that can be employed in a wide variety of sizes and shapes of cases. This object is achieved by forming the valance molding in a straight extruded elongate piece and then by bending the piece into conformity with the periphery of the case mouth.

Contributing to achievement of the above-stated object is a continuous dovetail slot throughout the length of the molding together with spaced-apart, excised regions for affording access to the slot. Thus, after the molding is formed and installed onto the case body, clamping blocks can be inserted in the slot through the excised regions and positioned at appropriate locations along the slot.

A feature and advantage of the above-described arrangement is that the cover panel that supports the equipment can be predrilled and the clamp bodies, since they are slidable in the slot, can be positioned so that their tapped holes are in registry with the predrilled holes in the cover plate.

Another object of the present invention is to provide a valance molding that affords a watertight joint when the container on which it is used is in a closed position. This object is achieved by providing a tongue and groove joint with a tubular gasket member disposed in the bottom of the groove. Additionally, the portion of the molding containing the groove has an abutment which bears against the above-mentioned cover panel to contribute to the weather-tight joint and to firmly retain the cover panel against movement.

A feature and advantage of firm retention of the cover panel or plate by the molding, when in the closed position, is that the entire periphery of the panel is supported, rather than only those locations at the clamp bodies. Thus, the electronic equipment, which is typically suspended from the panel, is not liable to damage during impacts arising from drop testing or from field usage of the equipment.

The foregoing, together with other objects, features and advantages, will be more apparent after referring to the following specification and accompanying drawing in which:

FIG. 1 is a perspective exploded view of a case on which the valance molding of the present invention is installed.

FIG. 2 is a cross-sectional view at enlarged scale taken along Line 2—2 of FIG. 1.

FIG. 3 is a fragmentary perspective view at enlarged scale of a portion of the improved valance molding of this invention.

FIG. 4 is a cross-sectional view similar to FIG. 2, but taken along Line 4—4 of FIG. 1, with the case in a closed position.

Referring more particularly to the drawing, reference numeral 12 indicates a case formed of wall panels 14, 16, 18 and 20, and a bottom panel, not shown. The panels are typically formed in an integral assembly from fiber glass reinforced plastic or like material. Because the side and bottom panels of the case are formed integrally, the case is substantially watertight. Circumscribing the mouth of the case is a valance molding 22. Carried by valance molding 22 is a plurality of clamp blocks 24 which have upward opening, threaded openings, for receiving screws 26 in order to retain within the mouth of case 12 a panel 28. Panel 28 typically supports electronic equipment and typically has one or more control knobs and/or wire terminal posts to permit operation of and connection to the equipment supported from the bottom of panel 28. A case cover 30 is constructed of material similar to that used in constructing case 12. An upper valance molding 32 circumscribes the rim of cover 30 and cooperates with valance molding 22 to effect a substantially weather-tight seal. Cover 30 can also be supplied with a handle 34 and with latches and/or hinges (not shown) for effecting attachment of the cover to the case.

Valance molding 22 includes a lower surface 34 in which is formed a continuous slot 36. Slot 36 is adapted to receive the upper edge of the mouth of case 12. The case is retained in slot 36 by means of adhesive or like expedient, the strength of the joint being relatively non-critical because the weight of the equipment carried in the case is not imposed on the joint between the case and the valance molding 22.

Valance molding 22 also includes an inner surface 38 in which is formed a continuous dovetail channel 40. Channel 40 is formed by an inner flat surface 42 from the edges of which there extend, toward surface 38, re-entrant portions 44 so that the dimension of channel 49 at surface 38 is less than the dimension of surface 42.

At spaced intervals along channel 40, re-entrant portions 44 are excised to define regions 46 that are enlarged so as to afford access to the channel. As indicated in FIG. 1, it is preferable that the excised regions be spaced along valance molding 22 such that there is one excised region at each side of the valance molding as it is configured when deformed to fit onto case 12. This relation permits installation of one, or more, clamp body 24 on each side of the mouth of the case.

Clamp body 24 has a lateral surface 48 adapted to confront surface 38 of valance molding 22. Extending from lateral surface 48 is a protrusion 50 which has a complemental shape to channel 40 (See FIG. 2). In the embodiment shown in the drawing, protrusion 50 has a dovetail shape. The length of protrusion 50 is such that it can be inserted through excised region 46 into channel 40. As shown in FIG. 3, clamp body 24 is in place, having been slid along channel 40 away from excised region 46. Clamp body 24 defines a tapped hole 52 therein which is oriented vertically and opens upward. Tapped hole 52 is adapted to receive screws 26.

As seen in FIG. 1, cover panel 28 is shaped congruent to the mouth of the case. Adjacent to periphery of the cover panel are formed holes 54 through which screws 26 are passed. Because clamp bodies 24 are slidable in channel 40, they can be positioned in registry with holes 54 in cover panel 28 to permit passage of screws 26 through the holes and into engagement with threaded hole 52 in the clamp body. Thereby, cover panel 28 is secured in place in the mouth of case 12. The equipment is typically suspended from cover panel 28 in order that access to the equipment for repair and maintenance can be had by removing screws 26 and the cover panel.

For cushioning panel 28 and the equipment secured thereto from excessive vibrations and providing a gasket, a resilient shock absorbing spacer 56 is placed on the upper surface of clamp body 24 between such surface and the lower surface of panel 28. Spacer 56 is preferably coextensive with the upper surface of 24 to maximize the area of surface contact afforded thereby. Spacer 56, because it circumscribes the shank of screw 26, also prohibits entry of water and like deleterious substances to the interior of case 12 through holes 54. For sealing the edge margin of panel 28 with respect to valance molding 22, there is a groove 58 formed in the upper surface of valance molding 22, an upstanding shoulder 60 forming one boundary of the groove. As seen in FIG. 2, the upper surface of shoulder 60 limits the downward movement of panel 28 so as to avoid over-compression of spacer 56 and over-compression of a tubular sealing gasket 62 disposed in groove 58. Preventing the over-compression of spacer 56 and gasket 62 assures that such parts will retain their resilience, because the elastic limit of the material of which the spacer and gasket are formed will not be exceeded.

The other side of slot 58 is defined by the vertical surface 64 of an upstanding tongue 66. The opposite surface of tongue 66 is indicated at 68 and slopes downward and outward from the upper extremity of the tongue.

With reference to FIG. 2, it will be seen that valance cover molding 32 has a groove 70 that has a shape complementary to tongue 66. Supported within groove 70 is a tubular gasket seal 72 which, when the cover is engaged on the case, is compressed within the groove by tongue 66. The lower surface of molding 32, indicated at 71, bears on the upper surface of panel 28 to secure the panel against vibration and to prevent overcompression of gasket seal 72. Because tongue 66 extends upward into groove 70 and because of the presence of sealing gaskets 62 and 72, there is virtually no possibility for the entry of water or the like to the interior of case 12.

When the case is closed (See FIG. 4), surface 71 of molding 32 bears against the upper surface of panel 28 and urges the lower surface of the panel into contact with shoulder 60 of molding 22. Because surface 71 and shoulder 60 are both continuous throughout the periphery of the joint between the moldings, the entire periphery of panel 28 is clamped between the surface and the shoulder. Thus, when the case is closed, as it is during testing and transport in the field, the panel and the electronic equipment mounted thereto is so firmly secured that it is virtually immune to damage. Moreover, overstressing of screws 26 and clamp bodies 24 is avoided when the case is in the closed condition.

Valance cover molding 32 has, on the upper surface thereof, a slot 74 into which is received the peripheral edge of cover 30. Valance molding 32 is retained onto cover 30 by means of adhesive or the like within slot 74.

The valance molding of the present invention is formed, preferably by an extrusion process, in stock lengths and without regard to the size of case 12. When the case has been fabricated, such as by pressure molding or the like, it is necessary only to cut the stock valance molding material to length, deform it into conformity with the shape of the mouth of the case and to install it by inserting the upper edges of the case into slot 36 with appropriate adhesive or the like. Formation of excised regions 46 can be effected on a production basis, at standard spaced intervals, or can be formed after the precise dimensions of the case mouth are known. In any event, it is desirable that when the valance molding is installed onto the case, as described above, there be at least one excised region on each linear side of the mouth. This is so because the portions of channel 40 at the corners of the case are distorted when the molding is deformed into conformity with the shape of the mouth. After the valance molding is in place on the case, as described above, a suitable number of clamp bodies 24 is inserted into channel 40 through excised regions 46. The clamp bodies can be positioned along the channel so that the threaded holes therein register with holes 54 in cover panel 28. Thereafter, the cover panel is installed and screws 26 are engaged into the threaded holes in the clamp blocks. Installation of the screws retains the panel in place and retains clamp bodies 24 against movement within channel 40. An alternate mode of practicing the invention is indicated at 76 in FIG. 3 which represents slight distortion of reentrant portions 44 adjacent clamp body 24, such as by center punching the same, in order to retain clamp body 24 at a desired location along channel 40. Such center punching, as has been stated above, is optional because the position of the clamp body along channel 40 is retained by engagement of screw 26 through the holes in panel 28.

Installation of valance molding 32 on cover 30 is effected in a similar manner to that described hereinabove in connection with valance molding 22. When the upper valance molding 32 is in place, suitable hinges or like fasteners can be installed onto the outer surfaces of the complemental valance moldings and engagement of the cover onto the case achieves a substantially waterproof container. Such is the case because the joint between the two moldings is sealed by gasket seals 62 and 72 and because no openings in the main body of case 12 or cover 30 are necessary. Should it be necessary to remove the equipment contained within the case for service or maintenance, screws 26 are removed whereupon panel 28 and the equipment secured thereto can be lifted out and exposed for such work.

Thus, it will be seen that the present invention provides an improved valance molding that can be fabricated by conventional metal forming techniques and which can be adapted to cases of virtually any size and shape. Moreover, the invention provides a method for securing the equipment within the case that is substantially independent of the particular size of the case and that is achieved without impairing, in any way, the integrity of the case.

Although one embodiment of the invention has been shown and described, it will be obvious that other adaptations and modifications can be made without departing from the true spirit and scope of the invention.

What is claimed is:

1. A formable valance molding for a case having a mouth bounded by edges of wall panels that form the case, said valance molding comprising an elongate deformable body having a length corresponding to the peripheral length of the mouth, said body having a first surface that defines a continuous slot therein for receiving the edges of the wall panels to secure the valance to the case, said body having a second surface generally normal to said first surface, said second surface facing inward with respect to said mouth, said body defining a continuous channel having a relatively small dimension in said second surface and a relatively large dimension inward of said second surface, portions of said body being excised in a region adjacent said channel to afford access to said channel, a clamp body having a lateral surface adapted to confront said second surface and a protrusion extending from said lateral surface and being configured complementally to said channel so as to be retained therein, said excised region having a longitudinal extent such that said protrusion can be introduced and retained in said channel by inserting said protrusion into said channel at the excised region and sliding the body away from said excised region, said clamp body having means for fastening a mouth spanning panel member thereto.

2. A valance molding, according to claim 1, wherein said mouth has four linear sides arranged in a rectangular configuration, said valance having a corresponding shape, there being one or more excised regions in each of said sides.

3. A valance molding, according to claim 1, wherein said body includes a third surface opposite said first surface, said third surface defining an upstanding tongue, there being a deformable member having a lower surface defining a groove for receiving said tongue, said deformable member having an upper surface opposite said lower surface, said upper surface defining a slot for receiving the edges of a cover for said case.

4. A valance molding, according to claim 3, including a tubular resilient gasket disposed in said groove and means for limiting entry of said tongue into said groove to avoid over-compression of said gasket.

5. A valance molding, according to claim 4, wherein said entry-limiting means comprises a bearing surface on said deformable member adjacent said groove on the side of said member toward the interior of said case, said valance molding having an upward facing shoulder on which said panel member resides, said tongue having an extent such that when said bearing surface bears on said panel said tongue compresses said resilient gasket within the elastic limit thereof, said bearing surface gasket to retain said panel member against said shoulder when said deformable member and said valance molding are interengaged.

6. A valance, according to claim 5, wherein said clamp body has an upward facing surface at a level below said shoulder and wherein said fastening means includes a threaded hole formed in said clamp body at said upward facing surface and a screw engagable in said threaded hole, there being a resilient spacer disposed on said upward facing surface, said spacer having a hole therein in registry with said threaded hole and inward of the periphery thereof so that portions of said spacer totally circumscribe said screw.

7. A valance molding, according to claim 5, wherein said valance molding defines a continuous groove intermediate said shoulder and said tongue, a resilient tubular gasket in said groove, said groove and said gasket being sized so that said gasket is compressed by said panel member.

* * * * *